United States Patent
Ogashiwa

(10) Patent No.: US 8,477,368 B2
(45) Date of Patent: Jul. 2, 2013

(54) PRINTING APPARATUS AND PRINT DATA PROCESSING SYSTEM COMBINING STORED PATTERN-BASED PRINT DRAWING DATA WITH NEWLY-RECEIVED PRINT DRAWING DATA

(75) Inventor: Akiyoshi Ogashiwa, Tokyo (JP)

(73) Assignee: Oki Data Corporation, Tokyo (JP)

( * ) Notice: Subject to any disclaimer, the term of this patent is extended or adjusted under 35 U.S.C. 154(b) by 780 days.

(21) Appl. No.: 12/621,901

(22) Filed: Nov. 19, 2009

(65) Prior Publication Data

US 2010/0134830 A1    Jun. 3, 2010

(30) Foreign Application Priority Data

Nov. 28, 2008   (JP) .................... 2008-304173

(51) Int. Cl.
*G06F 15/00* (2006.01)
*G06F 3/12* (2006.01)
*G06K 1/00* (2006.01)
*G06K 9/00* (2006.01)

(52) U.S. Cl.
USPC ........... 358/1.9; 358/1.13; 382/123; 382/181; 382/187

(58) Field of Classification Search
None
See application file for complete search history.

(56) References Cited

U.S. PATENT DOCUMENTS

| | | | |
|---|---|---|---|
| 5,803,629 A * | 9/1998 | Neville et al. ................. | 400/304 |
| 6,421,461 B1 * | 7/2002 | Arai et al. ..................... | 382/187 |
| 2004/0041030 A1 * | 3/2004 | Nimura et al. ................ | 235/468 |
| 2004/0190019 A1 * | 9/2004 | Li et al. .......................... | 358/1.9 |
| 2006/0078200 A1 * | 4/2006 | Koyama et al. ............... | 382/181 |
| 2006/0132855 A1 * | 6/2006 | Dokuni et al. ................. | 358/448 |
| 2006/0274948 A1 * | 12/2006 | Wamg et al. .................. | 382/202 |
| 2007/0020009 A1 * | 1/2007 | Fukuda .......................... | 400/62 |
| 2007/0230750 A1 * | 10/2007 | Ikeda et al. .................... | 382/123 |
| 2008/0088860 A1 * | 4/2008 | Yoshida ......................... | 358/1.8 |
| 2009/0073502 A1 | 3/2009 | Ishizaki | |

FOREIGN PATENT DOCUMENTS

| | | |
|---|---|---|
| EP | 2037354 A2 | 3/2009 |
| JP | 2001-313834 A | 11/2001 |
| JP | 2006-141062 A | 6/2006 |
| JP | 2008022153 A | 1/2008 |
| JP | 2008282411 A | 11/2008 |
| JP | 2009-070232 A | 4/2009 |

* cited by examiner

*Primary Examiner* — Ming Hon
(74) *Attorney, Agent, or Firm* — Panitch Schwarze Belisario & Nadel LLP

(57) ABSTRACT

A printing apparatus includes a print drawing data storage storing first print drawing data from a print data generation apparatus, an administration information unit storing administration information of the first print drawing data, and an image processing unit. The print data generation apparatus includes a pattern data register registering pattern data corresponding to first image information, a pattern data converter, a first image converter converting the pattern data into the first print drawing data, a second image converter converting second image information into second print drawing data, and an image composition unit combining the first and second print drawing data. The image processing unit determines whether administration information of first print drawing data newly received and already stored in the administration information unit are the same. If so, the image processing unit combines the first print drawing data already stored and the second print drawing data.

7 Claims, 15 Drawing Sheets

| 1 | 1 | 2 | 1 | 3 | 4 |
| 1 | 3 | 4 | 2 | 1 | 2 |
| 2 | 3 | 1 | 1 | 3 | 4 |
| 2 | 4 | 1 | 3 | 1 | 1 |
| 3 | 3 | 1 | 1 | 2 | 1 |
| 1 | 4 | 1 | 1 | 2 | 3 |

|  | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0020 |   |   |   | . | .. | ... | . | . | . | . |   |   |   |   |   | ... |
| 0030 | .. | .. | .. | .. | .. | .. | .. | .. | .. | .. | .. | .. | .. | .. | .' | .. |
| 0040 | ... | ... | ... | ... | .. | ... | ... | ... | ... | ... | ... | ... | ... | ... | ... | ... |
| 0050 | ... | ... | ... | ... | ... | ... | ... | ... | ... | ... | ... | ... | ... | ... | ... | ... |
| 0060 | ... | ... | ... | ... | ... | ... | ... | ... | ... | ... | ... | ... | ... | ... | ... | ... |
| 0070 | ... | ... | ... | ... | ... | ... | ... | ... | ... | ... | ... | ... | ... | ... | ... | ... |
| 0080 |   |   |   |   |   |   |   |   |   |   |   |   |   |   |   |   |

FIG. 8A

| L | C | R | L | C | R |
|---|---|---|---|---|---|
| 1 | 1 | 2 | 1 | 3 | 4 |
| 1 | 3 | 4 | 2 | 1 | 2 |
| 2 | 3 | 1 | 1 | 3 | 4 |
| 2 | 4 | 1 | 3 | 1 | 1 |
| 3 | 3 | 1 | 1 | 2 | 1 |
| 1 | 4 | 1 | 1 | 2 | 3 |

FIG. 8B

| | |
|---|---|
| 0x41 | 0x4B |
| 0x4B | 0x51 |
| 0x58 | 0x4B |
| 0x5c | 0x60 |
| 0x68 | 0x44 |
| 0x4C | 0x46 |

| ADMIN. No. | START POSITION DATA (X-COORDINATE) | START POSITION DATA (Y-COORDINATE) | SIZE | PAGE |
|---|---|---|---|---|
| 1 | 00010001 | 00010001 | A4 | 1 |
| 2 | 00020001 | 00010001 | A4 | 1 |
| 3 | 00010001 | 00020001 | A3 | 1 |
| 4 | 00020001 | 00020001 | B4 | 1 |

PRINTING APPARATUS AND PRINT DATA PROCESSING SYSTEM COMBINING STORED PATTERN-BASED PRINT DRAWING DATA WITH NEWLY-RECEIVED PRINT DRAWING DATA

BACKGROUND OF THE INVENTION

1. Field of the Invention

The present invention relates to a printing apparatus printing the print data generated by a print data generation apparatus generating print data inputtable in handwriting with an electronic pen, and to a print data processing system including the print data generation apparatus and the printing apparatus.

2. Description of Related Art

An electronic pen as a data input device for computerizing data such as various application documents and medical records is easier to use than keyboard or mouse, and is in heavy usage to record handwriting input by a pen as data. An "Anoto pen" developed by Anoto Group AB of Sweden is known as a representative example of such an electronic pen. The "Anoto pen" is used with a sheet of dedicated paper (also referred to as Anoto paper) having a predetermined dot pattern (also refereed to as an Anoto pattern) printed thereon. The "Anoto pen" has a small camera mounted at a pen tip of a normal ballpoint pen and the like for reading the dot pattern on the dedicated paper, and has a data communication device for transmitting the read data to an information terminal device in the vicinity thereof.

For example, when a user writes a character, etc. or touches an image on the dedicated paper with the "Anoto pen," the small camera detects the dot pattern on the dedicated paper with a movement of the pen, thereby obtaining handwriting data (also referred to as stroke data) of the character, image, etc. written by the user. Such handwriting data are transmitted by the data communication device from the "Anoto pen" to the information terminal device such as a personal computer and a mobile phone in the vicinity of the "Anoto pen."

A method of preparing print data used for printing the dot pattern to be detected by the "Anoto pen" has been introduced (e.g., Patent Document 1).

Patent Document 1: Japanese Un-examined Patent Application Publication No. 2006-141062

According to the method disclosed in the above Patent Document 1, however, the dot pattern is generated as a raster data image when image data of the dot pattern are formed. Moreover, a large volume of the image data needs to be handled to arrange the raster data image in an image document, causing performance deterioration of a data preparation process and a data transfer process of the printer driver, and a data receiving process and a data analysis process of the printer.

The present invention has been made to reduce (if not prevent) an occurrence of the above drawbacks, and provides a printing apparatus printing print data generated by a print data generation apparatus not only capable of allowing a dedicated sheet having dot pattern for detecting the handwriting data by an electronic pen to be printed in an inexpensive manner, but also capable of enhancing the performance of a data preparation process and a data transfer process of a printer driver, and the performance of a data receiving process and a data analysis process and the like of the printer. Moreover, the present invention provides a print data processing system formed of the printing apparatus with the print data generation apparatus.

BRIEF SUMMARY OF THE INVENTION

According to an aspect of the present invention, a printing apparatus includes: a print drawing data storage unit storing first print drawing data included in print drawing data received from a print data generation apparatus; an administration information unit storing administration information relating to the first print drawing data; and an image processing unit determining whether or not administration information relating to first print drawing data newly received and the administration information relating to the first drawing data already stored in the administration information unit and are substantially the same, and combining the first print drawing data already stored in the print drawing data storage unit and the second print drawing data received in a case where the administration information relating to the first print drawing data newly received and the administration information relating to the first print drawing data already stored in the administration information unit are substantially the same. The print data generation apparatus includes: a pattern data registration unit registering pattern data corresponding to first image information prepared based on an image formed in a first region on a recording medium capable of being read by an electronic pen obtaining handwriting data with a movement of a pen tip; a pattern data conversion unit converting the first image information into corresponding pattern data from the pattern data registered in the pattern data registration unit; a first image conversion unit converting the pattern data converted by the pattern data conversion unit into the first print drawing data drawn with a first color material to be optically read by the electronic pen; a second image conversion unit converting a second image information prepared based an image formed in a second region on the recording medium into second print drawing data drawn with a second color material; and an image composition unit combining the first print drawing data converted by the first image conversion unit and the second print drawing data converted by the second image conversion unit.

Additional features and advantages of the present invention will be more fully apparent from the following detailed description of embodiments, the accompanying drawings and the associated claims.

BRIEF DESCRIPTION OF THE DRAWINGS

A more complete appreciation of the aspects of the present invention and many of the attendant advantage thereof will be readily obtained as the same becomes better understood by reference to the following detailed description when considered in connection with the accompanying drawings, wherein:

FIGS. 8A and 8B are schematic diagrams illustrating an example of a code array corresponding to the dot pattern and a calculation example of a character code, respectively;

DETAILED DESCRIPTION OF PREFERRED EMBODIMENTS

Figure 1:
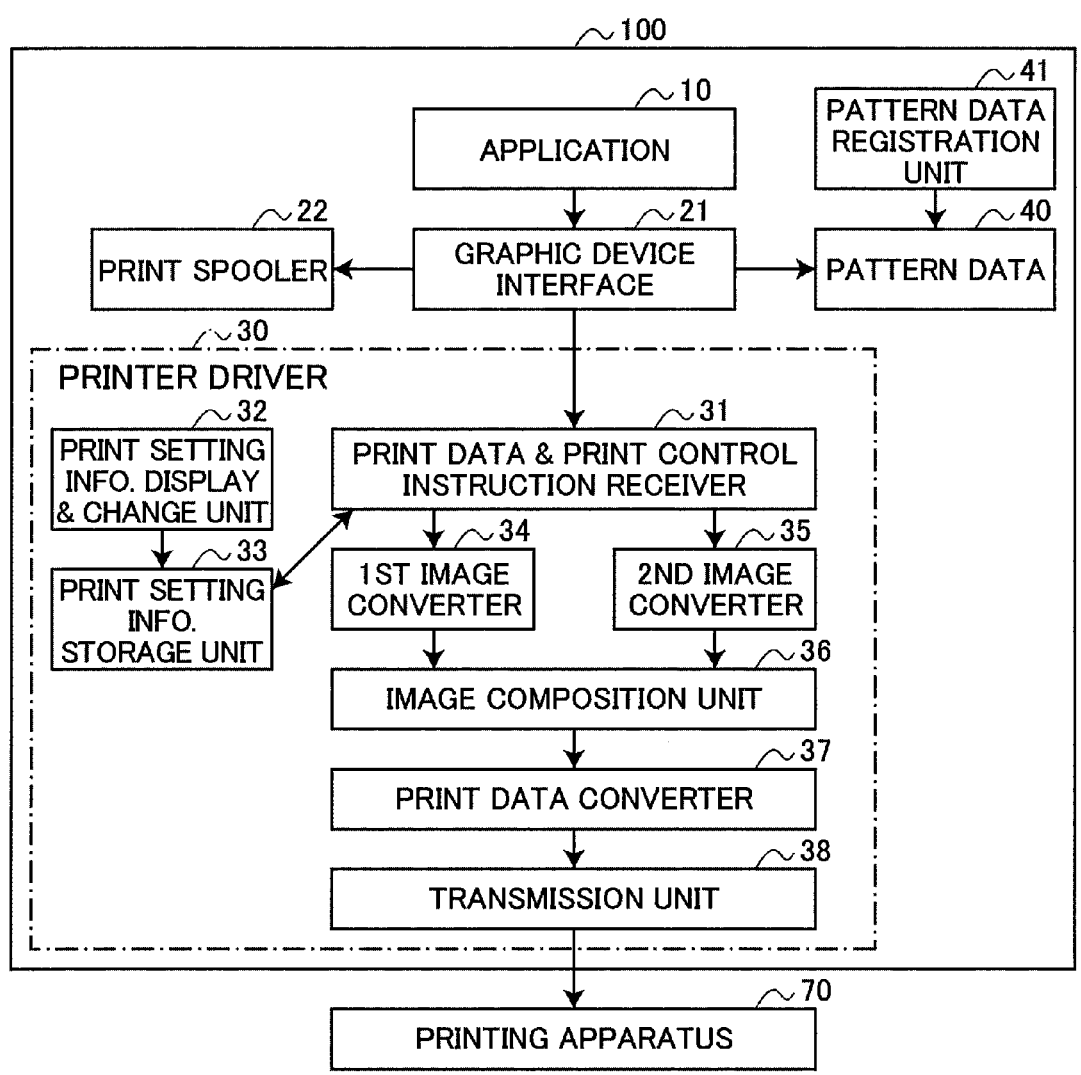
FIG. 1 is a block diagram illustrating a print data generation apparatus according to a first embodiment of the present invention.

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner. Preferred embodiments of the present invention are described in detail referring to the drawings, wherein like reference numerals designate identical or corresponding parts throughout the several views.

A description of a print data generation apparatus used for a printing apparatus according to the present invention is given, followed by a description of the printing apparatus printing print data generated by the printing generation apparatus.

First Embodiment

Referring to FIG. 1, a print data generation apparatus 100 according to a first embodiment of the present invention is illustrated. The print data generation apparatus 100 includes an application 10, a graphic device interface 21 serving as a pattern data conversion unit, a print spooler 22, a printer driver 30, pattern data 40 and a pattern data registration unit 41.

The application 10, serving as an application program, prepares a print document and provides a print execution instruction to the graphic device interface 21. The graphic interface 21 provides a pattern data conversion function (described later) and a graphic drawing (hereafter referred to as a print data drawing) used by the application 10 for execution of printing the print document. The print spooler 22 administrates the print data drawing used by the application 10 for execution of printing the print document as a print job. The pattern data 40 includes a combination of a plurality of dot patterns to be read by an electronic pen (described later). In the first embodiment, a user prepares the pattern data 40 with a TrueType font beforehand. The pattern data registration unit 41 registers the pattern data 40 in an operating system.

The printer driver 30 includes: a print data and print control instruction receiver 31; a print setting information display and change unit 32; a print setting information storage unit 33; a first image conversion unit 34; a second image conversion unit 35; an image composition unit 36; a print data conversion unit 37; and a transmission unit 38.

The print data and print control instruction receiver 31 receives the beginning and end of a print job, an instruction of an image conversion method and the print data drawing. The print setting information display and change unit 32 allows a current set content to be displayed on a display device such as a display and receives a set content change made by the user through an external input device such as a mouse and a keyboard. The print setting information storage unit 33 stores print set information that is input through the print setting information display and change unit 32. The first image conversion unit 34 converts first image information converted into the pattern data 40 by the graphic device interface 21 into first print drawing data drawn in black (K) serving as a first color material. The second image conversion unit 35 converts second image information into second print drawing data drawn in cyan (C), magenta (M) and yellow (Y) each of which serves as a second color material. The image composition unit 36 combines the first and second print drawing data converted by the first and second image conversion units 34, 35, respectively. The print data converter 37 converts the data combined by the image composition unit 36 into print control data being dependent on a printing apparatus 70. The transmission unit 38 transmits the print control data converted by the print data converter 37 to the printing apparatus 70.

Figure 2:
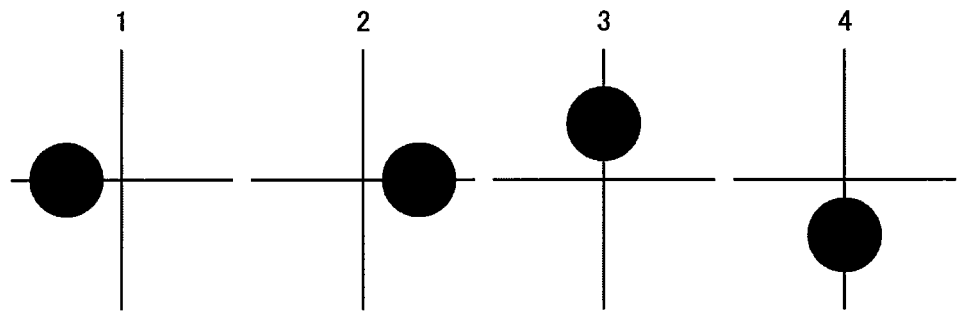
FIG. 2 is a schematic diagram illustrating an example of dot displacement in a quaternary notation system.
Figure 3A:
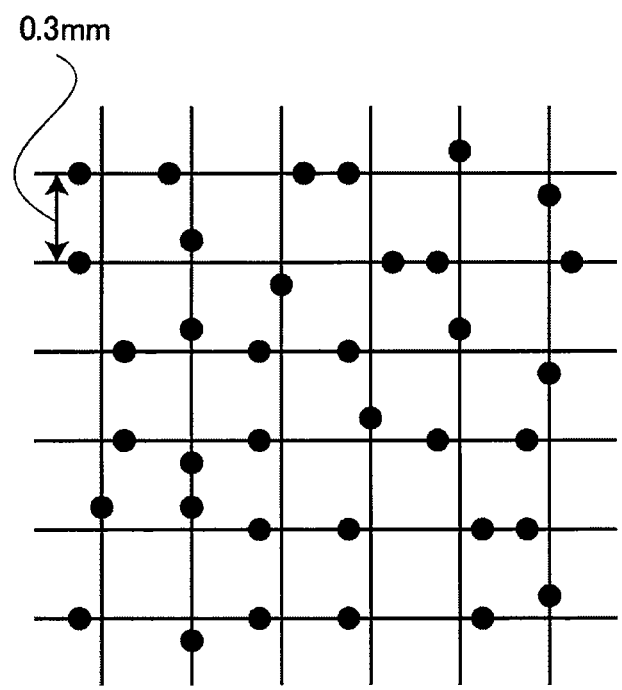
FIGS. 3A and 3B are schematic diagrams illustrating an example of a code expressed by a dot pattern of 6×6.
Figures 3B, 4, 5:
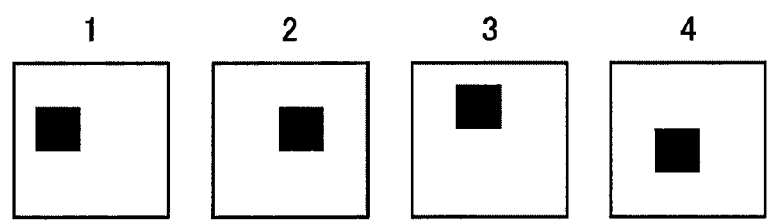
FIG. 4 is a schematic diagram illustrating an example of registration of a pattern corresponding to the quaternary notation system.
FIG. 5 is a schematic diagram illustrating an example of registration of a pattern having a combination of patterns in an amount of three dots.

Referring to FIGS. 2 through 5, an example of the dot pattern to be read by the electronic pen is illustrated according to the first embodiment of the present invention. The dot pattern is formed by displacing dots in vertical or horizontal directions from respective interception points in a lattice having lattice lines, or a grid, with an interval of 0.3 mm, and the displacement of dots is expressed in a quaternary notation system as illustrated in FIG. 2. The dots are arranged in the lattice lines having the interval of 0.3 mm. As illustrated in FIGS. 3A and 3B, a unit for the dot pattern is six by six (6×6) in width and height (i.e., six by six in the vertical and horizontal directions), and the displacement of dots is numerically arranged in the quaternary notation system, respectively. Such a data arrangement includes a numerical value indicating a position coordinate.

Where the dot pattern is generated as the pattern data 40, each of the dots in the dot pattern can be registered as one of four patterns as illustrated in FIG. 4. A position of the dot is expressed by the quaternary notation system. In other words, the dot position is expressed by a numeric value of a single digit, thereby reducing a volume of data to be ⅛ compared to a situation in which the dot is actually calculated and arranged.

According to the first embodiment, however, the pattern combined with a plurality of dots is registered as one font. In the first embodiment, a pattern combined up to three (3) dots in width is prepared as a glyph of the TrueType font format to express with the dots in six by six (6×6) in width and height, and a character code corresponding to each glyph is defined beforehand. Although the pattern combined up to three (3) dots in width is registered in the first embodiment, a pattern combined with at least four (4) dots in width or a pattern combined with width and height may be registered. However, it should be noted that the greater the number of dots to be registered, the greater the volume of data to be registered.

A size of each dot needs to be set in a recognizable size by the small camera mounted in the electronic pen and in a printable size that is a size surely printed by the printing apparatus 70. According to the first embodiment, a resolution is 600 dots per inch (dpi), and pixels of two by two (2×2) in width and height are formed in such a manner to arrange the dots with the resolution of 600 dpi. In a case where the TrueType font is generated, the dot pattern is defined in such a manner as to be most suitable in a situation in which twelve (12) points (1 point=1/72 inch) are designated since the dot pattern to be read by the electronic pen is much smaller than a regular character. Herein, a height of the character is arranged in such a manner as to be 0.3 mm. Precisely, a height of an actual character is smaller than 0.3 mm due to dependency on the resolution of the printing apparatus 70. Specifically, the height of the character is arranged in such a manner as to be seven (7) dots in a case where the character is converted into the resolution of 600 dpi.

Figure 6:
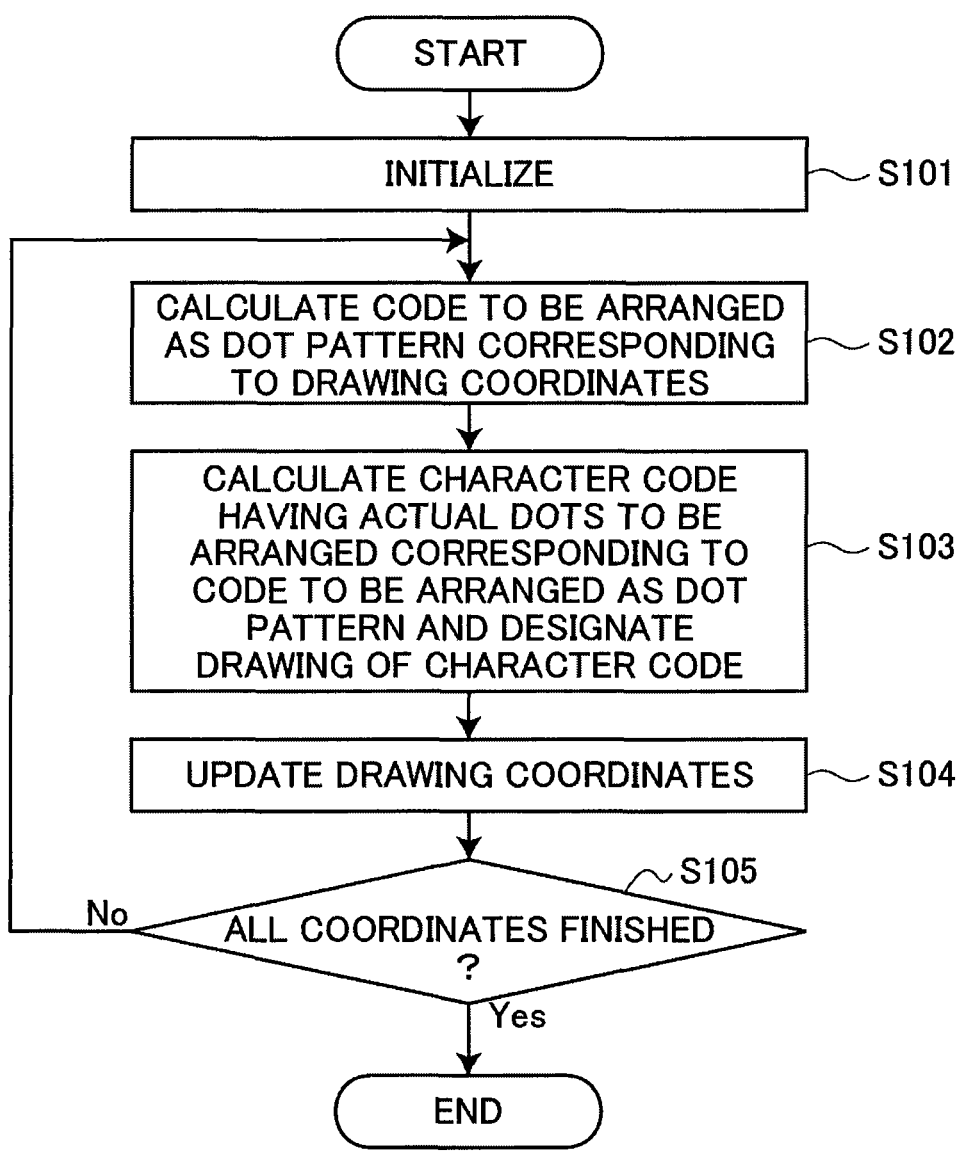
FIG. 6 is a flowchart illustrating an example procedure for drawing pattern data.

Referring to FIG. 6, a flowchart illustrates an example procedure for converting a dot pattern portion on the form sheet to be read by the electronic pen into a character code.

Figure 7A:
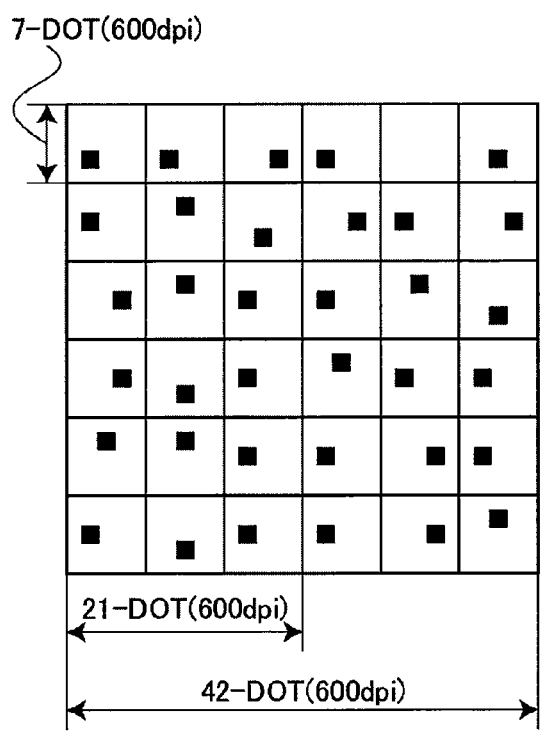
FIGS. 7A and 7B are schematic diagrams illustrating an example size of the dot pattern in a case of 600 dpi.
Figure 7B:
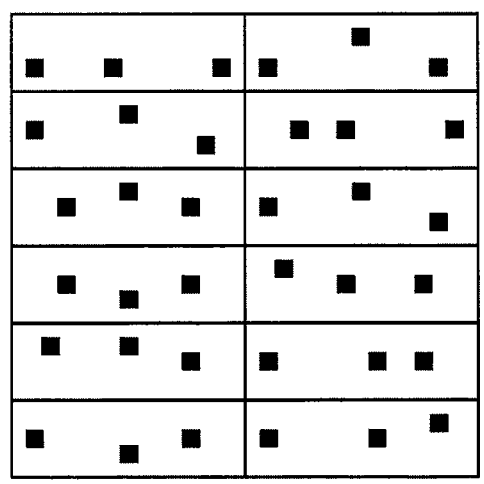

The dot pattern to be read by the electronic pen is formed in a collection of dots in six by six (6×6) in width and height as described above with reference to FIGS. 3A and 3B, and is expressed in a size of forty two (42) bits in height and forty two (42) bits in width in 600 dpi in the first embodiment as illustrated in FIG. 7A. Three (3) dots in width are used to express one (1) font character, thereby expressing a total of twelve (12) characters as illustrated in FIG. 7B. Consequently, one (1) font character is twenty-one (21) dots in width and seven (7) dots in height. Therefore, twenty-one bits by seven bits (21 bits×7 bits) is expressed by one (1) code (i.e., 8 bits), allowing a decrease in volume of the data to 1/18 or below.

In step S101, the application 10 initializes a number of calculation and a coordinate position on the form sheet to be used for drawing the dot pattern. In step S102, the application 10 calculates a code to be arranged as the dot pattern corresponding to drawing coordinate. As illustrated in FIGS. 3A, 3B and 8A, the code is a numeric array of six by six (6×6) in width and height and is expressed by the quaternary notation system of one (1) through four (4).

Subsequently, the application 10 transmits the code to be arranged as the dot pattern to the graphic device interface 21. Upon receiving the code, the graphic device interface 21 calculates a character code corresponding to the code, calculated in step S102, to be arranged as the dot pattern. The calculation of the character code is expressed by a calculation formula below.

$$\text{Character code}=64+((L-1)\times 16)+((C-1)\times 4)+(R-1),$$

where L, C and R represent values as follows.

L: a value in left of a code array expressed by three dots in width.

C: a value in a middle of the code array expressed by three dots in width.

R: a value in right of the code array expressed by three dots in width.

An example of the code array corresponding to the dot pattern is illustrated in FIG. 8A, and a calculation example of the character code is illustrated in FIG. 8B.

In step S103, the graphic device interface 21 designates all the twelve characters such that the TrueType font registered beforehand in the pattern data registration unit 41 corresponds to the character code calculated by the above calculation formula.

When the calculation of the character code and the correspondence with the TrueType font are finished in step S103, flow proceeds to step S104 in which the graphic device interface 21 updates coordinates in which the dot pattern in drawn.

Next, in step S105, the graphic device interface 21 determines whether or not the TrueType font characters are arranged in all the coordinates across one page. Where the TrueType font characters are not arranged in all the coordinates across one page (No in Step S105), flow proceeds back to step S102. Where the graphic device interface 21 determines that the TrueType font characters are arranged in all the coordinates across one page (Yes in step S105), the graphic device interface 21 allows a series of processes to end.

Figure 9:
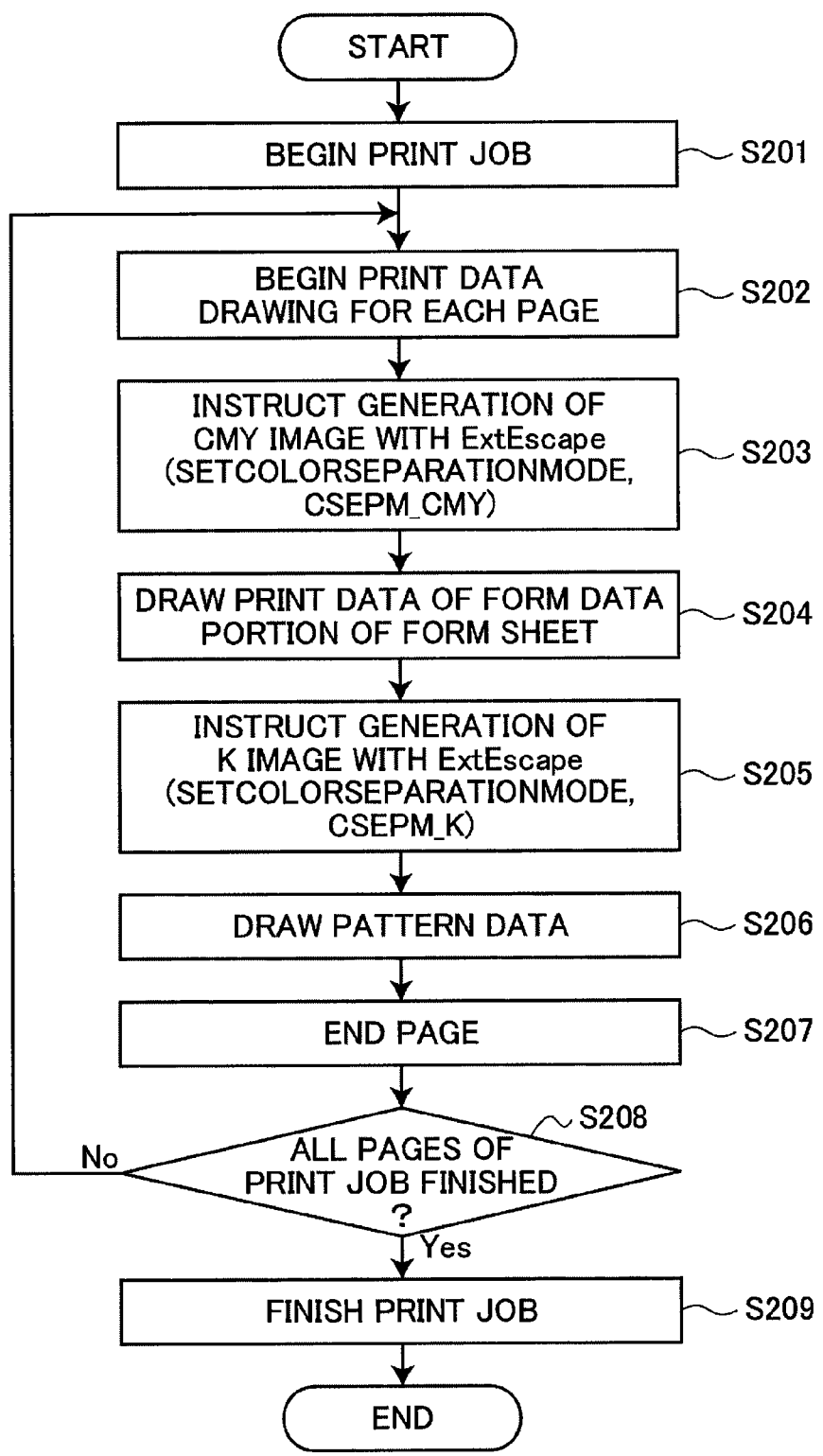
FIG. 9 is a flowchart illustrating an example procedure of printing operation.

Referring to FIG. 9, a flowchart illustrates an example procedure for a series of printing operation according to the first embodiment.

The user registers the TrueType font of the pattern data 40 prepared by using the pattern data registration unit 41 in the operating system before printing the print document. The operating system provides a function that can be used to register the pattern data 40 therein.

Next, the user invokes the print setting information display and change unit 32 through the graphic device interface 21 for setting a print style, etc. of the print document, so that the current print set is displayed on the display device, thereby inputting a set change with the external input device such as the mouse and keyboard. The print setting information storage unit 33 stores the print set information changed by the user.

Subsequently, the application 10 begins a series of processes for converting the dot pattern portion of the form sheet to be read by the electric pen described above with reference to FIG. 6 into the character code. Simultaneously, the application 10 instructs the graphic device interface 21 to begin a print job in step S201 in addition to the process of the character code conversion. Upon receiving the instruction of the print job, the graphic device interface 21 executes an initiation process for the print job. Particularly, the graphic device interface 21 notifies the print spooler 22 of the beginning of the print job. The graphic device interface 21 also notifies the printer driver 30 of the beginning of the print job. Upon receiving the notification of the beginning of the print job, the printer driver 30 separates the print document into each page and begins the print data drawing in step S202.

Next, the application 10 determines whether the first image conversion unit 34 or the second image conversion unit 35 executes the process of the image information for drawing the print data. For example, in a case where Windows (trademark) is used, the application 10 can use ExtEscape interface capable of designating a direct instruction to the printer driver 30. The ExtEscape includes an escape function ID to which "SETCOLORSEPARATIONMODE" is designated. In a case where the first image conversion unit 34 is used as an input parameter, "CSEPM_K" is designated. On the other hand, in a case where the second image conversion unit 35 is used, "CSEPM_CMY" is designated. Herein, values for "SETCOLORSEPARATIONMODE," "CSEPM_K," and "CSEPM_CMY" are defined as constant numbers beforehand.

In step S203, the application 10 uses the ExtEscape ("SETCOLORSEPARATIONMODE," "CSEPM_CMY"), and instructs the printer driver 30 to generate an image with CMY. Upon receiving the instruction, the printer driver 30 begins a preparation for generating the image with CMY.

In step S204, the graphic device interface 21 draws the second print drawing data, or namely a portion corresponding to a form data portion of the form sheet and being unnecessarily read by the electronic pen, with the second color materials of CMY capable of not absorbing an infrared light. Accordingly, a CMY image is generated. Particularly, the image conversion is executed according to a flowchart of FIG. 10 (described later). Upon receiving the instruction from the graphic device interface 21 to generate the second print drawing data having CMY, the print data and print control instruction receiver 31 switches the second image conversion unit 35 to be used to the image conversion method designated.

Figure 10:
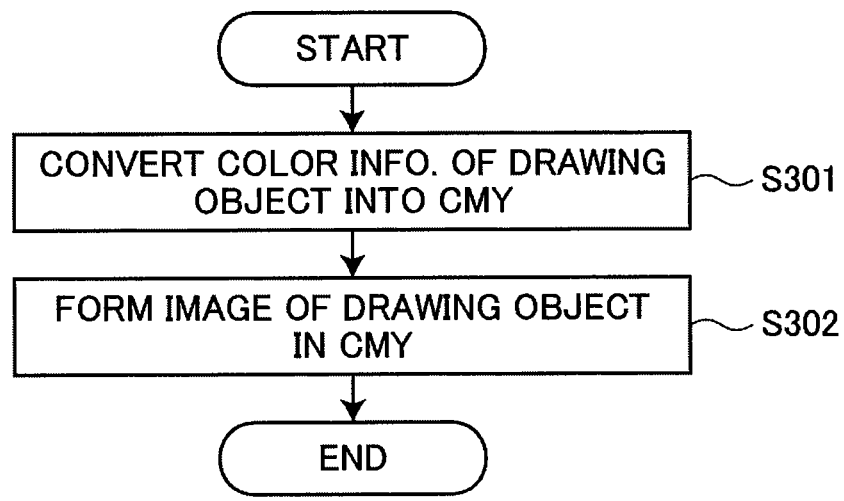
FIG. 10 is a flowchart illustrating an example procedure for converting an image by a second image converter.

The second image conversion unit 35 converts color information of a drawing object into CMY in step S301 in the flowchart of FIG. 10, and forms an image of the drawing object in CMY in step S302. Herein, an image format can be easily processed by the image composition unit 36 or the print data converter 37, and can be a format not in need of reconversion of the image to transfer to the print apparatus 70.

Next, in step S205 in the flowchart of FIG. 9, the application 10 uses the ExtEscape ("SETCOLORSEPARATION-MODE," "CSEPM_K"), and instructs the printer driver 30 to generates an image with K. Upon receiving the instruction, the printer driver 30 begins a preparation for generating the image with K.

In step S206, the graphic device interface 21 draws the first print drawing data, or namely a portion corresponding to the dot pattern of the form sheet and to be read by the electronic pen, with the first color material K capable of absorbing the infrared light. Accordingly, a K image is generated. Particularly, the image conversion is executed according to a flowchart of FIG. 11 (described later). Upon receiving the instruction from the graphic device interface 21 to generate the first print drawing data having K, the print data and print control instruction receiver 31 switches the first image conversion unit 34 to be used to the image conversion method designated.

Figure 11:
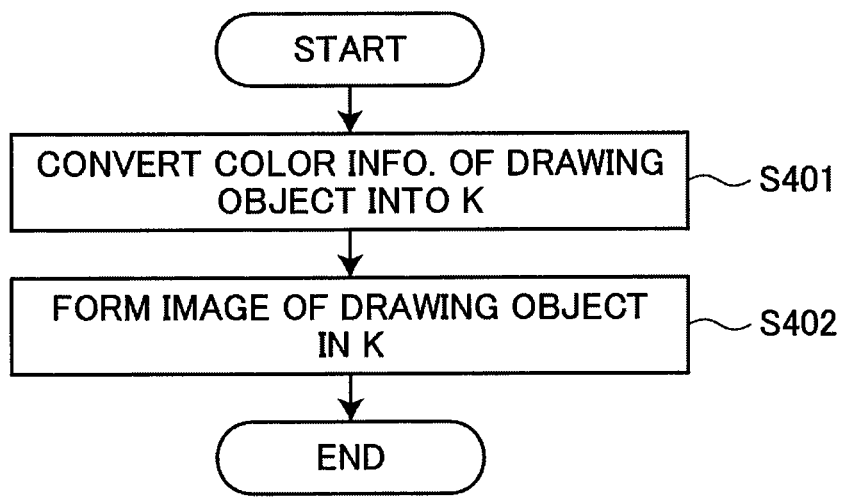
FIG. 11 is another flowchart illustrating an example procedure for converting an image by a first image converter.

The first image conversion unit 34 decodes the character code converted corresponding to the dot pattern of the drawing object, and converts the color information into K in step S401 of a flowchart in FIG. 11. Subsequently, the first image conversion unit 34 forms an image of the drawing object in K in step S402 of the flowchart in FIG. 11. Herein, an image format can be easily processed by the image composition unit 36 or the print data converter 37, and can be a format not in need of re-conversion of the image to transfer to the print apparatus 70.

The image composition unit 36 combines the CMY image generated in step S204 and the K image generated in step S206. Subsequently, the print data converter 37 converts a composite image of the CMY image and the K image combined by the image composition unit 36 into a print control code being dependent on the print apparatus 70. The transmission unit 38 transmits the print control code converted by the print data converter 37 to the printing apparatus 70, thereby finishing the drawing for a page in step S207.

The graphic device interface 21 determines whether or not drawing of all pages of the print jobs is finished in step S208. Where not all of pages are drawn (No in step S208), flow proceeds back to step S202. Where the graphic device interface 21 determines that the drawing of all pages is finished (Yes in step S208), flow proceeds to step S209.

In step S209, the graphic device interface 21 executes a post-process such as opening a resource of a memory used for the page drawing and finishes the print job.

According to the first embodiment of the present invention, the print data generation apparatus 100 allows a sheet of dedicated paper having the dot pattern for detecting the handwriting data by the electronic pen to be printed by an inexpensive general-purpose printer. Moreover, the dot pattern to be read by the electronic pen is defined as the font beforehand, and the font corresponding to the dot pattern to be drawn is designated by the character code according to the first embodiment, so that a series of processes can be executed quickly by an advantage of font cache. Moreover, since the dot pattern is designated as the code instead of a bit image, thereby reducing a volume of the data to be processed.

Second Embodiment

In a case where a dot pattern to be read by an electronic pen is printed in all printable regions across a page, for example, in a print document having print data for reading such as a bar-code, the dot pattern is even printed in a portion on the read data such as the bar-code, possibly causing a decrease in a reading rate of the bar-code.

According to a second embodiment, there provides a print data generation apparatus 200 capable of analyzing the print document, extracting the portion of the read data such as the bar-code, and not generating the dot pattern to be read by the electronic pen in a vicinity of the portion of the read data.

The print data generation apparatus 200 according to the second embodiment is similar to the print data generation apparatus 100 described above according to the first embodiment. Therefore, only components and/or configurations of the print data generation apparatus 200 that differ from those of the print data generation apparatus 100 will be described, and like components will be given the same reference numerals as above and description thereof will be omitted for the sake of simplicity.

Figure 12:
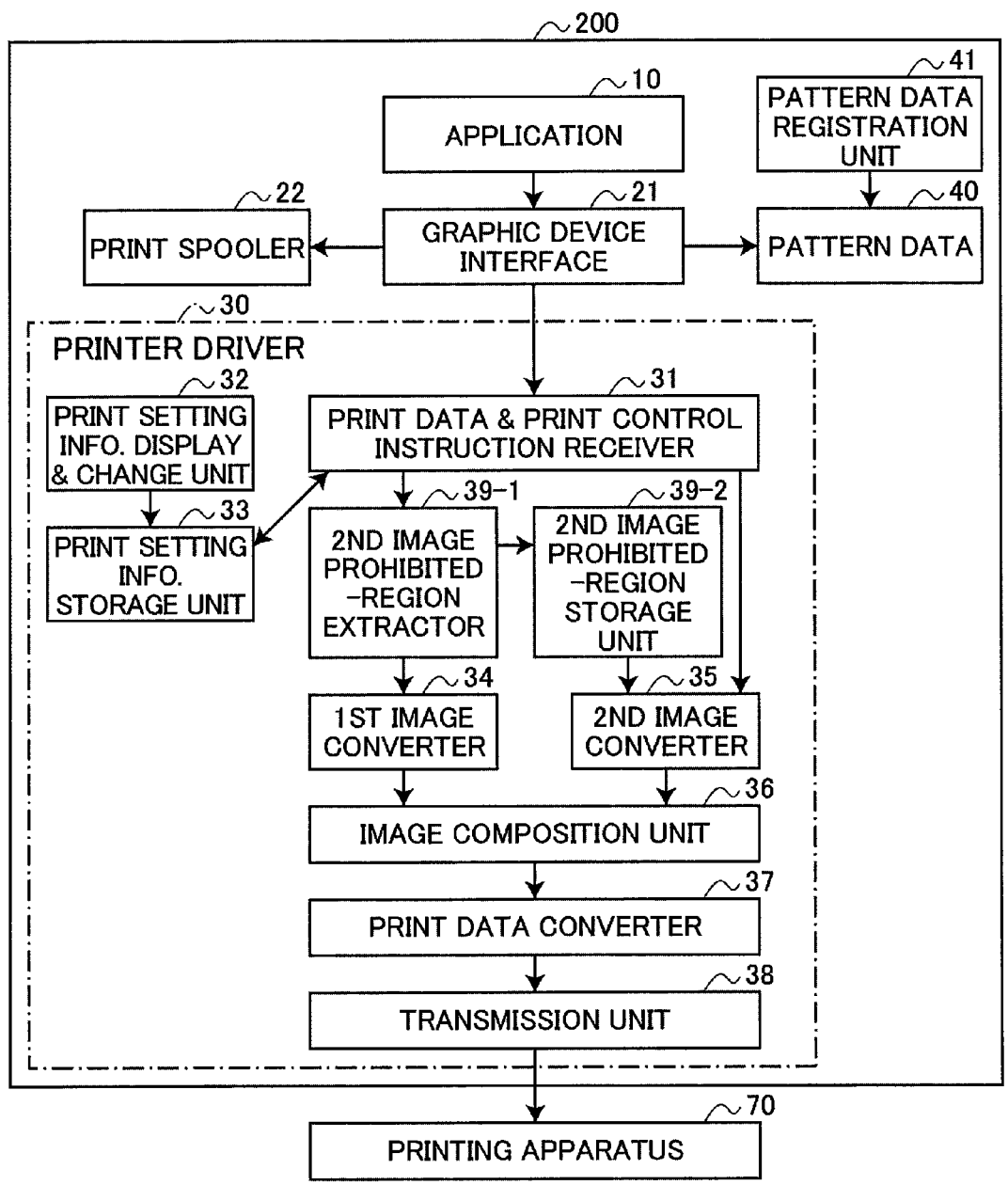
FIG. 12 is a block diagram illustrating a print data generation apparatus according to a second embodiment of the present invention.

Referring to FIG. 12, the print data generation apparatus 200 according to the second embodiment is illustrated in a block diagram. The print data generation apparatus 200 includes a second image prohibited-region extractor 39-1 and a second image prohibited-region storage unit 39-2 in addition to the components and/or configurations of the print data generation apparatus 100 described above in the first embodiment.

The second image prohibited-region extractor 39-1 analyzes each drawing object of the print data drawing, and extracts an image region of the bar-code, etc. in a case of drawing the object in a page as an image. The second image prohibited-region storage unit 39-2 stores an image prohibited-region extracted by the second image prohibited-region extractor 39-1.

Specifically, the second image prohibited-region extractor 39-1 classifies each drawing object of the print data, detects a code generating an image of the bar-code or an optical character reader (OCR) character, etc. to be read by a reading device after printing the print document, and extracts an image region for the bar-code or the OCR character, etc. as a second image prohibited-region. The second image prohibited-region storage unit 39-2 stores the second image prohibited-region with a number of drawing objects as region rectangular information.

Now, flow of print data formation by the print data generation apparatus 200 is described. The print data formation by the print data generation apparatus 200 is similar to the flow of the print data formation described above according to the first embodiment except for step S204 (described above with reference to the flowchart of FIG. 9) in which the print data in the form data portion of the form sheet is drawn and for step S103 (described above with reference to the flowchart of FIG. 6) in which the dot pattern is drawn. In the second embodiment, a process corresponding to step S204 of the first embodiment is described below with reference to a flowchart of FIG. 13.

Figure 13:
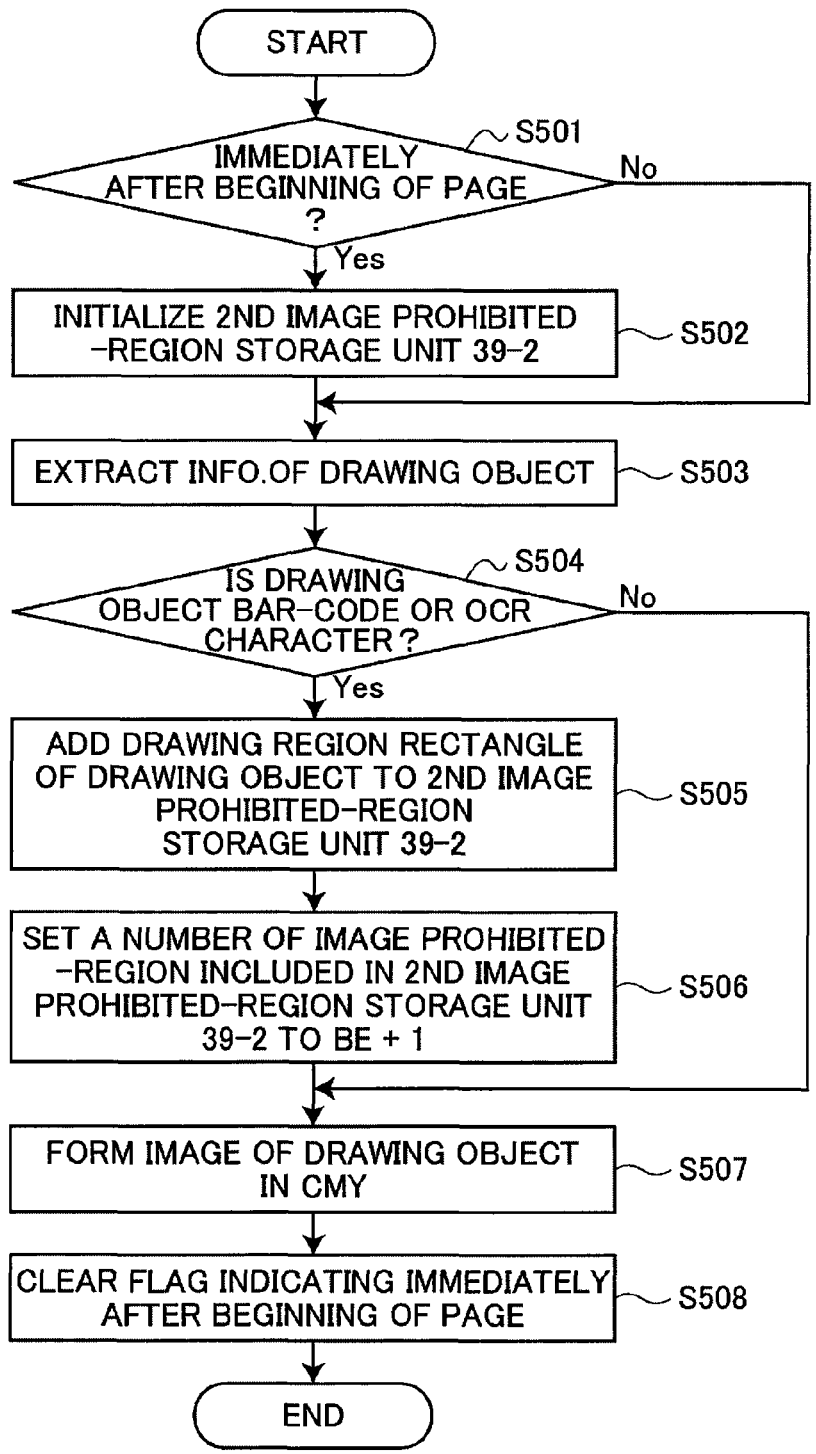
FIG. 13 is a flowchart illustrating an example procedure for drawing print data in a form data area of a form sheet according to the second embodiment.

In step S501 in the flowchart of FIG. 13, when an instruction for generating the image is provided from an application 10, a graphic device interface 21 determines whether or not it is immediately after beginning of the print data drawing for each page. Where it is immediately after beginning of the print data drawing for each page (Yes in step S501), flow proceeds to step S502 in which the graphic device interface 21 initializes the second image prohibited-region storage unit 39-2 and sets the image prohibited-region included therein as zero. On the other hand, where it is not immediately after beginning of the print data drawing for each page (No in step S501), flow proceeds to step S503.

In step S503, the second image prohibited-region extractor 39-1 analyzes the drawing object and extracts information such as distinctiveness of the drawing object.

In step S504, the second image prohibited-region extractor 39-1 classifies the drawing object, and determines whether or not the drawing object is the bar-code or the OCR character. Where the drawing object is determined as the bar-code or the OCR character (Yes in step S504), the second image prohibited-region extractor 39-1 calculates, based on an attribution of a size of typestyle or a volume of the code to be printed, a size of rectangle in which the image of the bar-code or the OCR character is to be actually formed, and adds the calculated size of rectangle to the second image prohibited-region storage unit 39-2. On the other hand, where the drawing object is not determined as the bar-code or the OCR character (No in step S504), flow proceeds to step S507.

In step S506, when the drawing region of the drawing object is stored in the second image prohibited-region storage unit 39-2, the graphic device interface 21 sets a number of image prohibited-region included in the second image prohibited-region storage unit 39-2 to be +1.

In step S507 in the flowchart of FIG. 13, a second image conversion unit 35 converts the color information of the drawing object into CMY as described above in step S301 in the flowchart of FIG. 10, and forms an image of the drawing object in CMY as described above in step S302 in the flowchart of FIG. 10. Herein, an image format can be easily processed by the image composition unit 36 or the print data converter 37, and can be a format not in need of re-conversion of the image to transfer to the print apparatus 70.

In step S508, the graphic device interface 21 clears a flag indicating a situation immediately after the beginning of the page.

In a series of processes for drawing the character code corresponding to the dot pattern using the printer driver 30, the second embodiment includes an additional process in which the image of the dot pattern is not generated in the second image prohibited-region. According to the second embodiment, a process corresponding to step S103 in the flowchart of FIG. 6 of the first embodiment is described below with reference to a flowchart of FIG. 14.

Figure 14:
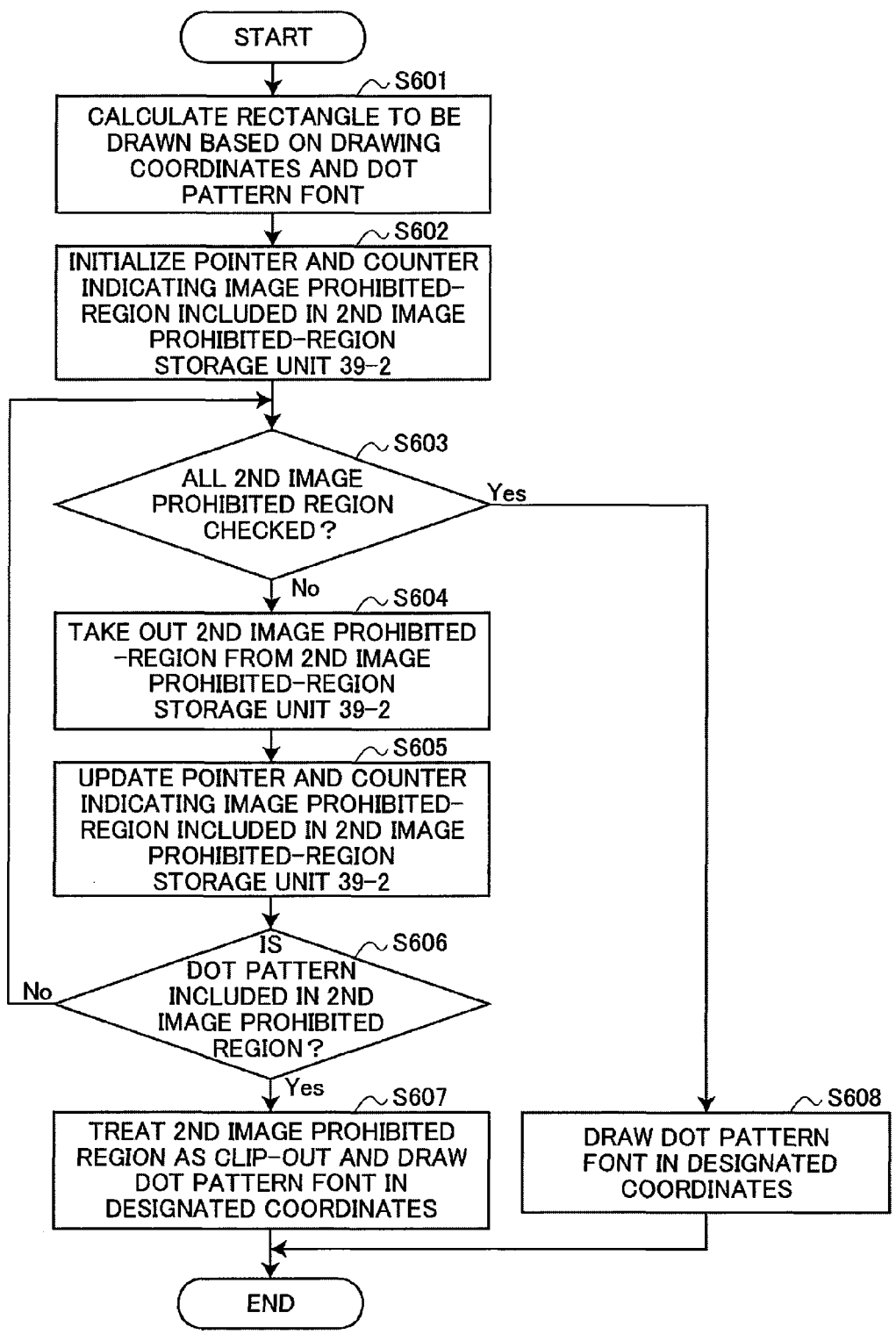
FIG. 14 is a flowchart illustrating an example procedure for drawing pattern data according to the second embodiment.

In step S601 in the flowchart of FIG. 14, the graphic device interface 21 calculates a rectangle to be drawn based on drawing coordinates and font of the dot pattern.

In step S602, the graphic device interface 21 initializes a pointer designating each of the image prohibited-region and a counter indicating a number of image prohibited-regions checked. The pointer and the counter are included in the second image prohibited-region storage unit 39-2.

In step S603, the graphic device interface 21 confirms whether or not all the number of the image prohibited-regions included in the second image prohibited-region storage unit 39-2 is checked. Where all the prohibited-regions is checked (Yes in step S603), flow proceeds to step S608 in which the graphic device interface 21 draws the dot pattern font in the designated coordinates without a clip-out region that is not to be drawn.

In step S604, the graphic device interface 21 takes out the second image prohibited-region designated by the pointer from the second image prohibited-region storage unit 39-2.

Subsequently, in step S605, the graphic device interface 21 updates the pointer designating the image prohibited-region and the counter indicating the number of the checked image-prohibited regions included in the second image-prohibited region storage unit 39-2.

In step S606, the graphic device interface 21 confirms whether or not the rectangle calculated in step S601 for drawing the font of the dot pattern and the second image-prohibited region taken out in step S601 have an overlap. Where the overlap is confirmed (Yes in step S606), flow proceeds to step S607. Where the overlap is not confirmed (No in step S606), flow proceeds back to step S603.

In step S607, the graphic device interface 21 treats the second image prohibited region taken out in step S604 as the clip-out region being not to be drawn, and draws the dot pattern font in the designated coordinates.

The drawing in steps S607 and S608 is executed by the flowchart of FIG. 11 described above in the first embodiment. That is, the graphic device interface 21 instructs a first image conversion unit 34 to convert the color information into K. Upon receiving the instruction from the graphic device interface 21, the first image conversion unit 34 decodes the character code converted corresponding the dot pattern of the drawing object, and coverts the color information into K as described in step S401 of the flowchart in FIG. 11. Subsequently, the first image conversion unit 34 forms the image of the object in K in step S402 of the flowchart in FIG. 11. Herein, the image format can be easily processed by the image composition unit 36 or the print data converter 37, and can be a format not in need of re-conversion of the image to transfer to the print apparatus 70.

Therefore, according to the second embodiment of the present invention, the print data generation apparatus 200 allows a sheet of dedicated paper having the image for reading such as the bar-code or the OCR character and the dot pattern for detecting the handwriting data by the electronic to be printed by an inexpensive general-purpose printer. Moreover, the dot pattern to be read by the electronic pen is defined as the font beforehand, and the font corresponding to the dot pattern to be drawn is designated by the character code according to the second embodiment, so that a series of processes can be executed quickly by an advantage of font cache.

Third Embodiment

In the second embodiment described above, the print data generation apparatus 200 extracts the portion of the read data such as the bar-code included in the print drawing data so as to provide the region in which the dot pattern to be ready by the electronic pen is not printed. According to a third embodiment, however, a print region of a print drawing object designated by an application program serves as a region in which a dot pattern to be read by an electronic pen is not printed.

Figure 15:
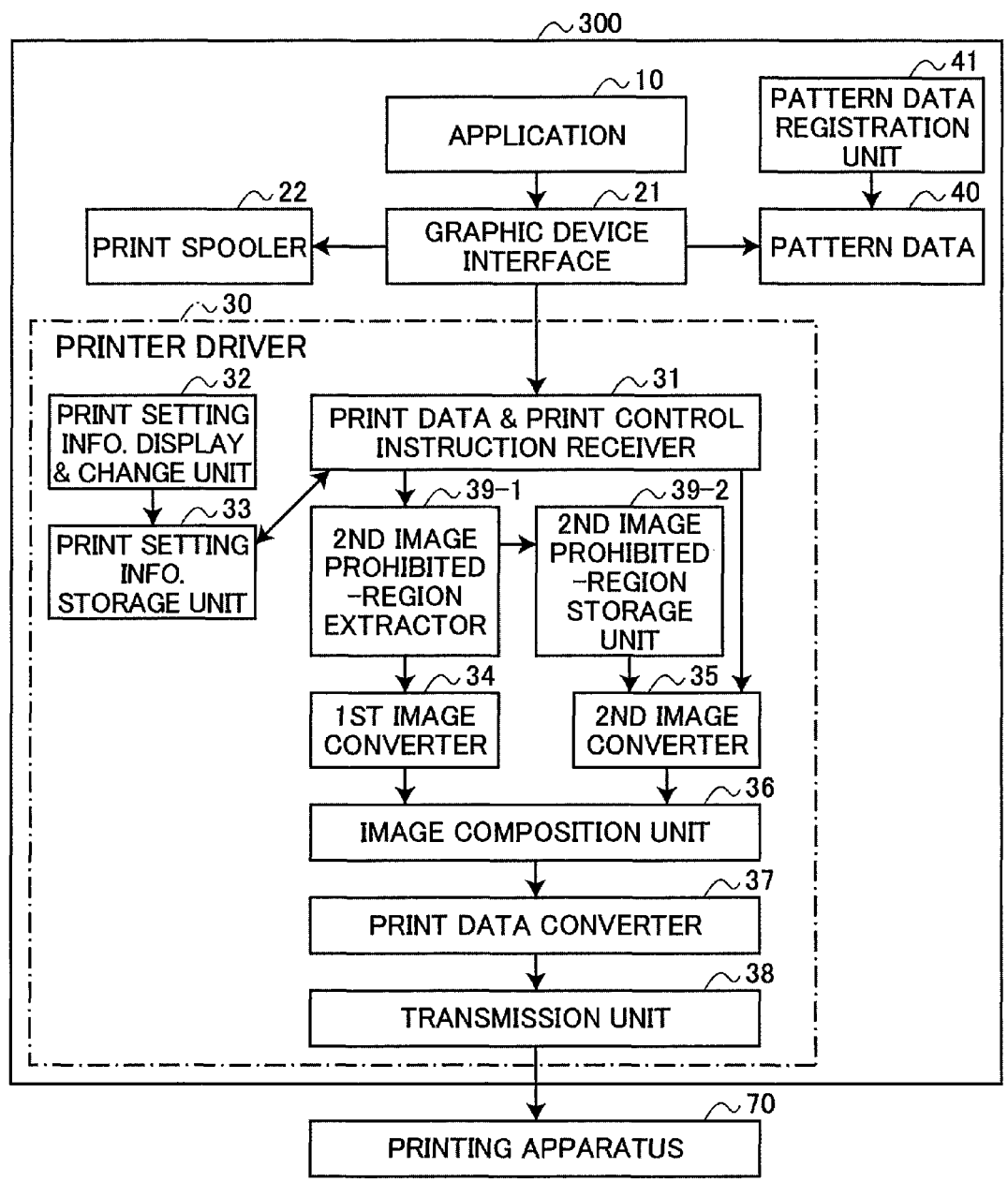
FIG. 15 is a block diagram illustrating a print data generation apparatus according to a third embodiment of the present invention.

Referring to FIG. 15, a print data generation apparatus 300 according to the third embodiment is illustrated. The print data generation apparatus 300 is similar to the print data generation apparatus 200 described above in the second embodiment. Therefore, only components and/or configurations of the print data generation apparatus 300 that differ from those of the print data generation apparatus 200 will be described, and like components will be given the same reference numerals as above and description thereof will be omitted.

Now, flow of print data formation by the print data generation apparatus 300 is described. The print data formation by the print data generation apparatus 300 is similar to the flow of the print data formation described above in the second embodiment except for a second image prohibited-region start instruction and a second image prohibited-region end instruction that are provided between the application 10 and the printer driver 30. The second image prohibited-region start instruction instructs to start providing the drawing object for the second image prohibited-region, and the second image prohibited-region end instruction instructs to end the drawing object for the second image prohibited-region.

The second image prohibited-region start instruction and the second image prohibited-region end instruction can use ExtEscape interface allowing the application 10 to designate the instruction directly to the printer driver 30. In an escape function ID of the ExtEscape, "STARTBARCODEMODE" is designated as the second image prohibited-region start instruction and "ENDBARCODEMODE" is designated as the second image prohibited-region end instruction. The "STARTBARCODEMODE" and "ENDBARCODEMODE" are given numerical values defined as constant numbers beforehand.

In a course of drawing the print data converted into the image using the second image conversion unit 35, the application 10 provides the second image prohibited-region start instruction to the printer driver 30 before drawing the object of the drawing object of the read data such as the bar-code and provides the second image prohibited-region end instruction to the printer driver 30 after drawing the object of the drawing object of the read data such as the bar-code.

Upon receiving the instruction from the application 10, the graphic device interface 21 of the printer driver 30 extracts the image region of the drawing object as the second image prohibited-region and instructs the second image prohibited-region storage unit 39-2 to store as rectangular information according to the instruction from the application 10 in a process of extracting the second image prohibited-region by the second image prohibited-region extractor 39-1.

Herein, a description is given of a particular example case in which the application 10 draws the bar-code as a bitmap. The application 10 designates "SETCOLORSEPARATIONMODE" to the escape function ID of the ExtEscape, inputs "CSEPM_CMY" as an input parameter, instructs the drawing using the second image conversion unit 35, and provides an instruction for drawing the bitmap of the bar-code or form sheet data.

Herein, the application 10 designates the "SETBARCODEMODE" to the escape function ID of the ExtEscape. Moreover, the application 10 provides the second image prohibited-region start instruction with respect to the graphic device interface 21 of the printer driver 30. Upon receiving the instruction, the graphic device interface 21 generates the bitmap of the bar-code and draws as a normal bitmap drawing object. After drawing the bitmap drawing object, the application 10 designates the "ENDBARCODEMODE" with respect to the escape function ID of the ExtEscape and provides the second image prohibited-region end instruction with respect to the graphic device interface 21.

Upon receiving the second image prohibited-region end instruction, the graphic device interface 21 provides the instruction to the second image prohibited-region extractor 39-1. The second image prohibited-region extractor 39-1 extracts an image region of the object drawn when each drawing object is drawn on a page (i.e., when an image region of the object is drawn between the second image prohibited-region start instruction and the second image prohibited-region end instruction), and adds the extracted image region to the second image prohibited-region storage unit 39-2 as the rectangular information.

Next, the application 10 designates the "SETCOLORSEPARATIONMODE" to the escape function ID of the ExtEscape, inputs "CSEPM_K" as an input parameter, and instructs the graphic device interface 21 to generate the dot pattern to be read by the electric pen using the first image conversion unit 34. Upon receiving the instruction, the graphic device interface 21 instructs the first image conversion unit 34 not to generate the dot pattern to be read by the electronic pen in the second image prohibited-region stored in the second image prohibited-region storage unit 39-2.

The image data generated by the first and second image conversion units 34, 35 are combined by the image composition unit 36, are converted into the print control data depended on the printing apparatus 70 in the print data converter 37, and are transmitted to the printing apparatus 70 through the transmission unit 38.

Therefore, according to the third embodiment of the present invention, the print data generation apparatus 300 allows a sheet of dedicated paper having the image for reading such as the bar-code and the dot pattern for detecting the handwriting data by the electronic pen to be printed by an inexpensive general-purpose printer while maintaining a read tolerance of the bar-code, etc. optionally designated by the application program. The dot pattern to be read by the electronic pen is defined as the font beforehand, and the font corresponding to the dot pattern to be drawn is designated by the character code, so that a series of processes can be executed quickly by an advantage of font cache.

According to the third embodiments, the process of the image conversion is executed within the printer driver 30. Alternatively, the printer driver 30 may transmit a registration command registering the font illustrated in FIG. 5 within the printing apparatus 70, a selection command of such a font, and a code indicating each dot pattern, thereby executing the image conversion into the dot pattern in the printing apparatus 70. Alternatively, the font illustrated in FIG. 5 may be registered in the printing apparatus 70 beforehand. Yet, the print data generation apparatuses 300 may output, for example, an Anoto pattern without application program data attached.

Fourth Embodiment

A description is given of a print data generation apparatus 400 and a printing apparatus 700 according to a fourth embodiment. The printing apparatus 700, serving as an example of a printing apparatus, and the print data generation apparatus 400 form a print data processing system.

Figure 16:
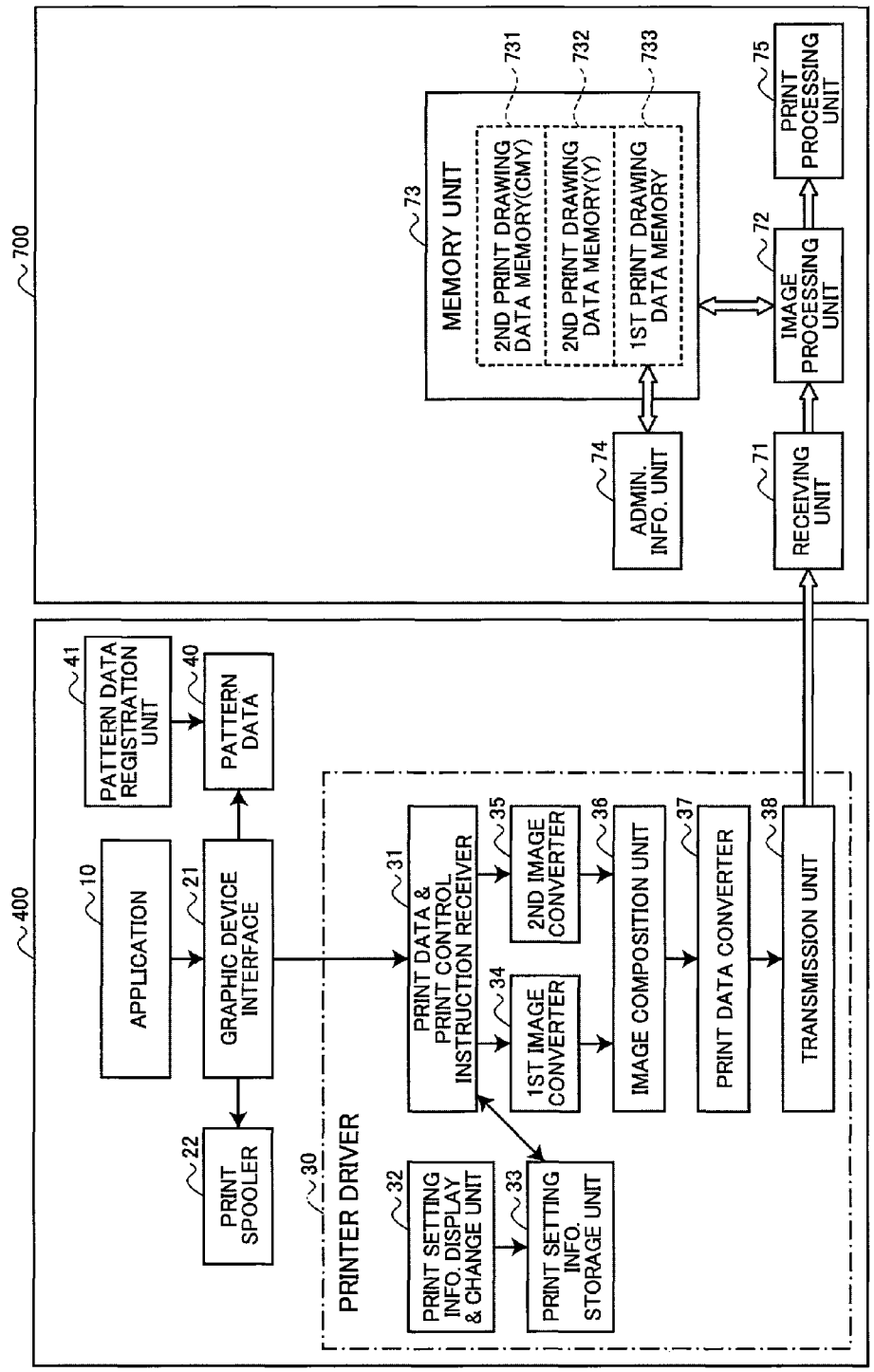
FIG. 16 is a block diagram illustrating a printing apparatus according to a fourth embodiment of the present invention.

Referring to FIG. 16, the printing apparatus 700 according to the fourth embodiment is illustrated in a block diagram. The printing apparatus 700 includes: a receiving unit 71 receiving dot pattern data, that is, first print drawing data and application data, from the print data generation apparatus 400, that is, the receiving unit 71 receiving print drawing data and the like including second print drawing data from the print data generation apparatus 400; an image processing unit 72 mapping the print drawing data received through the receiving unit 71 to a memory unit 73; the memory unit 73 storing the print drawing data; an administration information unit 74 storing administration information relating to the first print drawing data inside the print drawing data; and a print processing unit 75 printing the data processed by the image processing unit 72 to a recording medium.

The receiving unit 71, for example, is connected to the print data generation apparatus 400 through a network such as a local area network (LAN) to receive the administration information relating to the print drawing data or the first print drawing data inside the print drawing data transmitted from the print data generation apparatus 400.

Figures 17, 18:
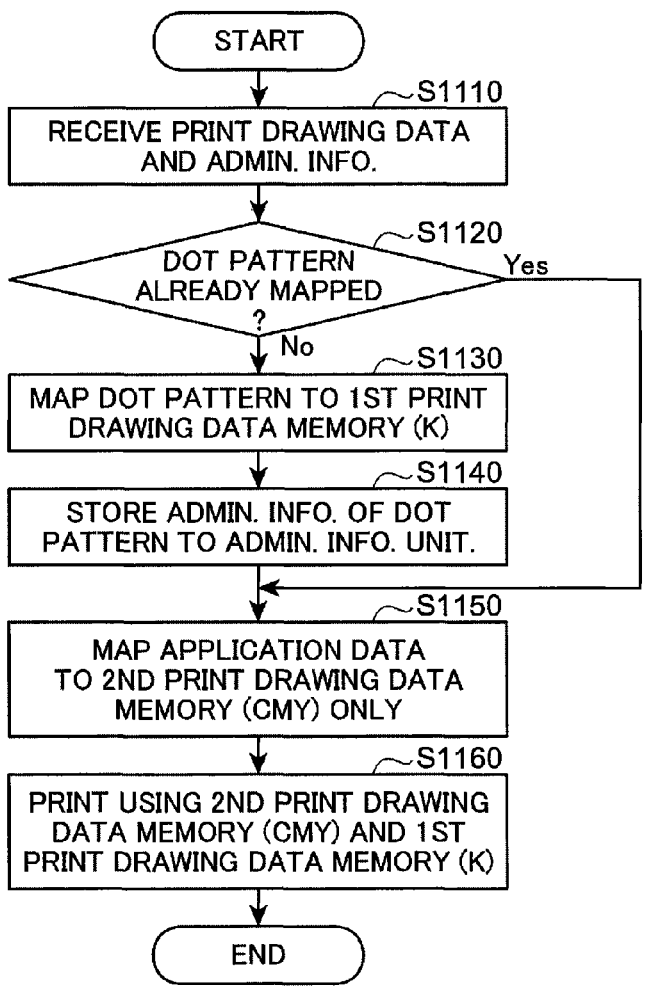
FIG. 17 is a schematic diagram illustrating an example of administration information.
FIG. 18 is a flowchart illustrating an example operating procedure of the printing apparatus according to the fourth embodiment.

The image processing unit 72 compares the administration information relating to the first print drawing data newly received and the administration information relating to the first print drawing data already mapped to and/or stored in a first print drawing data memory (K) 733 to determine whether or not the first print drawing data newly received are substantially the same as the first print drawing data already mapped to and/or stored in the first print drawing data memory (K) 733. Herein, the pattern data 40 described above and page information such as a start position address of the first print drawing data inside the print drawing data as illustrated in FIG. 17 may be used as the administration information. The image processing unit 72 maps the print drawing data to a prescribed memory region in the memory unit 73 with respect to each first print drawing data and second print drawing data, and executes image processing operation.

The memory unit 73 is divided into memory regions, so that the first print drawing data or the second print drawing data are stored in respective memory regions according to an instruction of the image processing unit 72. As illustrated in FIG. 16, the memory unit 73 includes a second print drawing data memory (CMY) 731, a second print drawing data memory (K) 732, and the first print drawing data memory (K) 733 each of which serves as the memory region. However, the memory unit 73 is not limited thereto. For example, a random access memory (RAM), a rewritable flash memory, or a hard disk drive (HDD) may be employed as the memory unit 73.

The administration information unit 74, serving as a memory region, stores the administration information relating to the first print drawing data inside the print drawing data. As similar to the memory unit 73, the RAM, the rewritable flash memory, the HDD and the like may be employed as the administration information unit 74.

The print processing unit 75, serving as an electrophotographic print engine, prints the data processed by the image processing unit 72 to the recording medium.

In a case where the printing apparatus 700 receives the print drawing data including the first print drawing data substantially the same as the first print drawing data already mapped and/or stored, the image processing unit 72 does not newly map the first print drawing data to the first print drawing data memory (K) 733, thereby reducing the time consuming for the mapping process of the first print drawing data.

Referring to a flowchart of FIG. 18, a description is given of the operation of the printing apparatus 700. According to the printing apparatus 700 of the fourth embodiment, following conditions are applied for the sake of simplicity of the description. First, an electronic pen uses infrared rays for optical reading, and the dot pattern data corresponding to the first print drawing data are printed using carbon-based black (K) toner or ink capable of absorbing the infrared rays. Second, the application data corresponding to the second print drawing data generated by an application 10 of the print data generation apparatus 400 are not printed using the carbon-based black (K) toner or ink to print, and are printed using the toner or ink of cyan (C), magenta (M), and yellow (Y), that is, the toner or ink excluding the black (K). Finally, in a case where a color of black needs to be expressed in printing the application data, the three colors of the cyan (C), the magenta (M), and the yellow (Y) are superimposed to form process black.

In step S1110, the printing apparatus 700 receives the print drawing data and the administration information from the print data generation apparatus 400 through the receiving unit 71.

Subsequently, the image processing unit 72 compares the administration information, retrieved from the administration information unit 74, relating to the dot pattern data already mapped to and/or stored in the first print drawing data memory (K) 733 and the administration information relating to the dot pattern data received through the receiving unit 71, and determines whether or not the dot pattern data inside the print drawing data received are already mapped to and/or stored in the first print drawing data memory (K) 733 (step S1120).

Where the print drawing data including the dot pattern data are received for the first time, that is, the dot pattern data are not mapped to and/or stored in the first print drawing data memory (K) 733 (No in step S1120), the image processing unit 72 allows the dot pattern data to be mapped to and/or stored in the first print drawing data memory (K) 733 (step S1130).

The image processing unit 72 allows the administration information relating to the dot pattern data mapped to and/or stored in the first print drawing data memory (K) 733 to be stored in the administration information unit 74 (step S1140).

The image processing unit 72 allows the second print drawing data corresponding to the application data to be mapped and stored in the second print drawing data memory (CMY) 731 (step S1150). The image processing unit 72 instructs the print processing unit 75 to print the dot pattern data mapped to and/or stored in the first print drawing data memory (K) 733 in step S1130 and the application data mapped to and/or stored in the second print drawing data memory (CMY) 731 in step S1150 on the recording medium. Upon receiving the instruction, the print processing unit 75 combines the dot pattern data and the application data and prints the combined data on the recording medium (step S1160).

Where the dot pattern data inside the print drawing data received are already mapped to and/or stored in the first print drawing data memory (K) 733 (Yes in step S1120), on the other hand, the image processing unit 72 omits the mapping and/or storing process of the dot pattern data with respect to the first print drawing data memory (K) 733.

The image processing unit 72 allows the application data corresponding to the second print drawing data to be mapped to and/or stored in the second print drawing data memory (CMY) 731 (step S1150). The image processing unit 72 instructs the print processing unit 75 to print the dot pattern data mapped to and/or stored in the first print drawing data memory (K) 733 and the application data mapped to and/or stored in the second print drawing data memory (CMY) 731 in step S1150 on the recording medium. Upon receiving the instruction, the print processing unit 75 combines the dot pattern data and the application data and prints the combined data on the recording medium.

Therefore, in a case where the print drawing data including the dot pattern data substantially the same as the dot pattern already mapped and/or stored are received, the image processing unit 72 does not newly map the dot pattern data to the fist print drawing data memory (K) 733, thereby shortening the time for the mapping process of the dot pattern data according to the fourth embodiment.

Fifth Embodiment

A printing apparatus 7000 according to a fifth embodiment is substantially the same as the printing apparatus 700 according to the fourth embodiment described above, and the description of the printing apparatus 7000 is omitted for the sake of simplicity. A print data generation apparatus 500 of the fifth embodiment is similar to the print data generation apparatus 400 of the fourth embodiment. According to the fifth embodiment, print drawing data including dot pattern are printed as similar to the fourth embodiment described above. A difference between the fifth and fourth embodiments is described with reference to a flowchart of FIG. 19.

Figure 19:
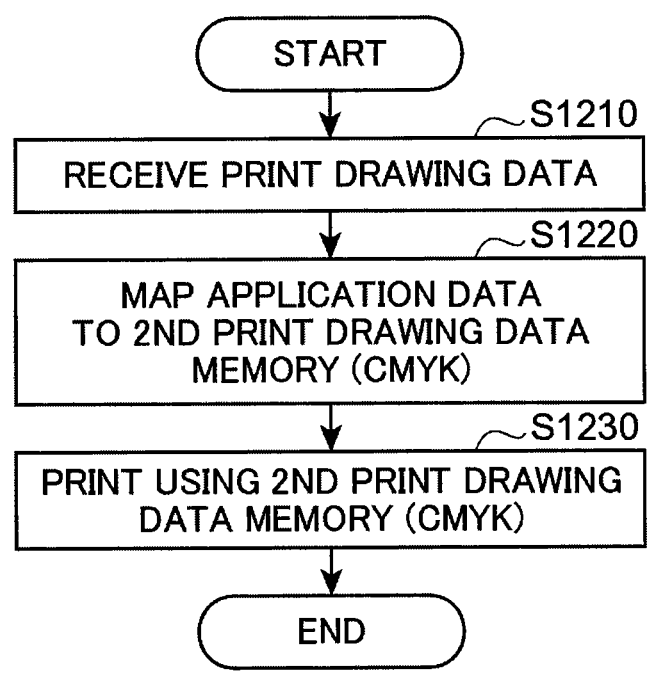
FIG. 19 is another flowchart illustrating an example operating procedure of a printing apparatus according to a fifth embodiment of the present invention.

The flowchart of FIG. 19 illustrates the printing process in a case where the print drawing data transmitted from the print data generation apparatus 500 do not include the dot pattern therein.

The printing apparatus 7000 receives the print drawing data from the print data generation apparatus 500 through a receiving unit 71 (step S1210).

Herein, the print drawing data received are determined to be formed of the application data, that is, the second print drawing data since the administration information is not received by an image processing unit 72.

Subsequently, the image processing unit 72 allows the data relating to a CMY image formed of three colors of cyan (C), magenta (M), and yellow (Y) in the application data to be mapped to and stored in a second print drawing data memory (CMY) 731, and allows the data relating to a K image formed of black (K) in the application data to be mapped to and stored in a second print drawing data memory (K) 732 without using a first print drawing data memory (K) 733 (step S1220).

The image processing unit 72 instructs the print processing unit 75 to print the data relating to the K image mapped to and/or stored in the second print drawing data memory (K) 732 and the data relating to the CMY image mapped to and/or stored in the second print drawing data memory (CMY) 731. Upon receiving the instruction, the print processing unit 75 combines the data relating to the K image and the data relating to the CMY image, and prints the combined data on the recording medium (step S1230).

According to the fifth embodiment, therefore, the dot pattern mapped to and/or stored in the first print drawing data memory (K) 733 is not changed in a case where the print drawing data having no dot pattern data are printed. Consequently, in a case where the print drawing data having the dot pattern data substantially the same as the dot pattern already mapped and/or stored are received later, the image processing unit 72 does not newly map the dot pattern in the first print drawing data memory (K) 733, thereby reducing the time consuming for the mapping process of the dot pattern data.

According to the fourth and fifth embodiments, a description is not given of a number and/or kind of a result obtained by the mapping process of the dot pattern data stored inside the printing apparatus. However, in a case where the result obtained by the mapping process of a plural kinds of dot pattern data is stored in the memory unit to print the print drawing data having the dot pattern data substantially the same as any of the dot pattern data stored in the memory unit, the mapping process of the dot pattern data can be omitted.

According to the fourth and fifth embodiments, the applications of the print drawing data memory are fixed beforehand for the dot pattern data (K) and the application data (CMY). However, the present invention is not limited thereto. For example, the application of the print drawing data memory may not necessarily fixed and may be switched according to the print drawing data received.

As can be appreciated by those skilled in the art, numerous additional modifications and variation of the present invention are possible in light of the above-described teachings. For example, the embodiments of the present invention can be applied to a printer, facsimile, a multifunction peripheral and a copier in addition to the printer driver 30. It is therefore to be understood that, within the scope of the appended claims, the disclosure of this patent specification may be practiced otherwise than as specifically described herein.

What is claimed is:

1. A printing apparatus comprising:
 a print drawing data storage unit storing first print drawing data included in print drawing data received from a print data generation apparatus that is an external device; the print data generation apparatus including:
  a pattern data registration unit registering pattern data corresponding to first image information prepared based on an image formed in a first region on a recording medium capable of being read by an electronic pen obtaining handwriting data with a movement of a pen tip;
  a pattern data conversion unit converting the first image information into corresponding pattern data from the pattern data registered in the pattern data registration unit;
  a first image conversion unit converting the pattern data converted by the pattern data conversion unit into the first print drawing data drawn with a first color material to be optically read by the electronic pen;
  a second image conversion unit converting a second image information prepared based an image formed in a second region on the recording medium into second print drawing data drawn with a second color material; and
  an image composition unit combining the first print drawing data converted by the first image conversion unit and the second print drawing data converted by the second image conversion unit,
  an administration information unit storing administration information relating to the first print drawing data; and
  an image processing unit determining whether or not administration information relating to first print drawing data newly received and the administration information relating to the first drawing data already stored in the administration information unit are the same, and combining the first print drawing data already stored in the print drawing data storage unit and the second print drawing data received in a case where the administration information relating to the first print drawing data newly received and the administration information relating to the first print drawing data already stored in the administration information unit are the same.

2. The printing apparatus according to claim 1, wherein the image processing unit does not make a change with respect to the first print drawing data already stored in the first print drawing data storage unit in a case where the first print drawing data are not included in the print drawing data received.

3. The printing apparatus according to claim 1, wherein the administration information unit includes plural pieces of information.

4. The printing apparatus according to claim 1, wherein the administration information is pattern data.

5. The printing apparatus according to claim 1, wherein the administration information is a start position information of the first print drawing data inside the print drawing data.

6. The printing apparatus according to claim 1, wherein the print drawing data storage unit stores at least one of the first print drawing data and the second print drawing data.

7. A print data processing system comprising:
 a print data generation apparatus, comprising:
  a pattern data registration unit registering pattern data corresponding to first image information prepared based on an image formed in a first region on a recording medium capable of being read by an electronic pen obtaining handwriting data with a movement of a pen tip;

a pattern data conversion unit converting the first image information into corresponding pattern data from the pattern data registered in the pattern data registration unit;

a first image conversion unit converting the pattern data converted by the pattern data conversion unit into first print drawing data drawn with a first color material to be optically read by the electronic pen;

a second image conversion unit converting a second image information prepared based an image formed in a second region on the recording medium into second print drawing data drawn with a second color material; and an image composition unit combining the first print drawing data converted by the first image conversion unit and the second print drawing data converted by the second image conversion unit; and a printing apparatus, comprising:

a print drawing data storage unit storing the first print drawing data included in the print drawing data received from the print data generation apparatus;

an administration information unit storing administration information relating to the first print drawing data; and an image processing unit determining whether or not administration information relating to first print drawing data newly received and the administration information relating to the first drawing data already stored in the administration information unit are the same, and combining the first print drawing data already stored in the print drawing data storage unit and the second print drawing data received in a case where the administration information relating to the first print drawing data newly received and the administration information relating to the first print drawing data already stored in the administration information unit are the same.

* * * * *